Figure 1:
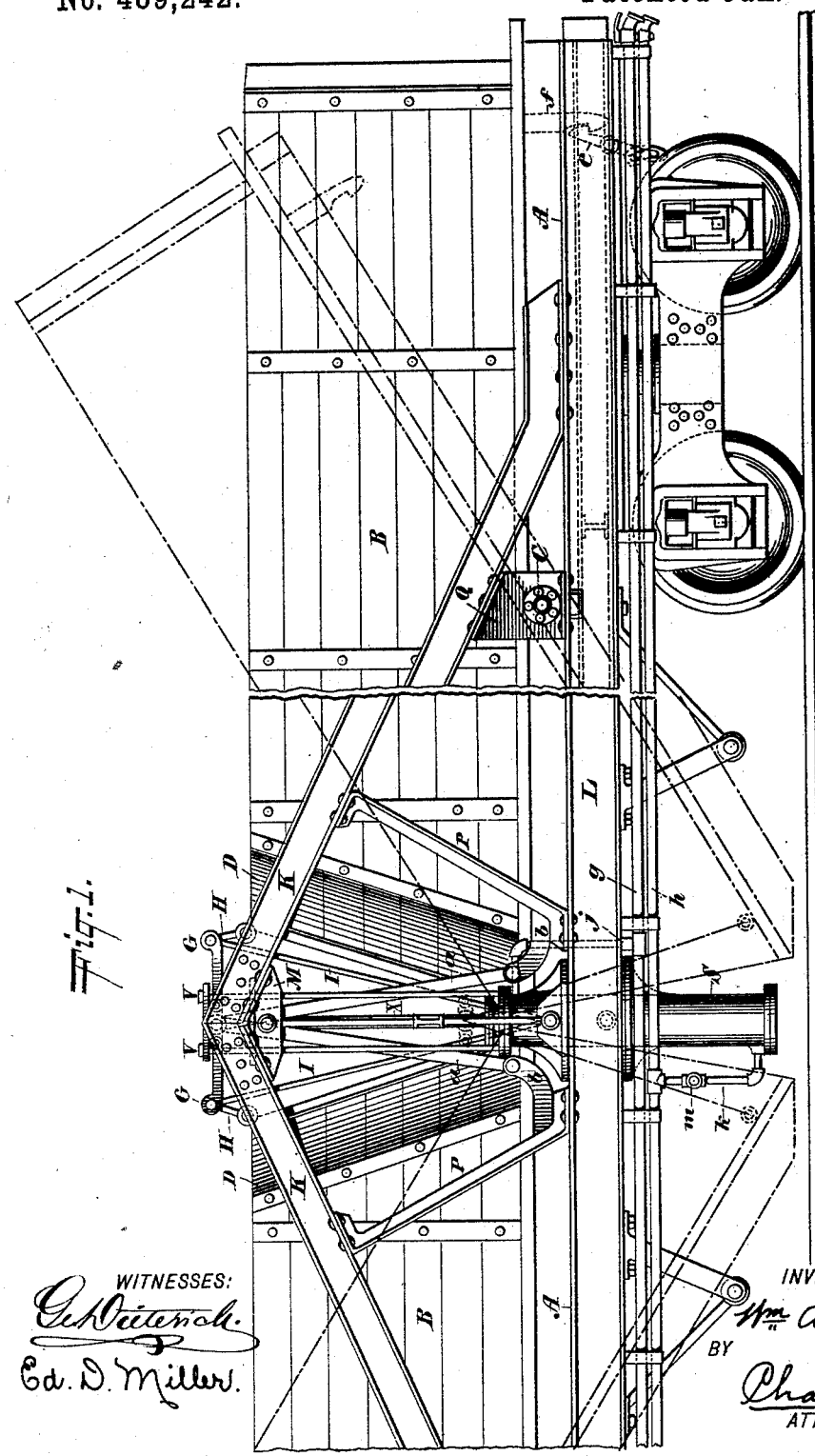

(No Model.) 5 Sheets—Sheet 3.

W. A. THACHER.
DUMPING CAR.

No. 489,242. Patented Jan. 3, 1893.

WITNESSES:
Gustav Dieterich
Ed. D. Miller

INVENTOR
Wm. A. Thacher,
BY
Chas. O. Gill
ATTORNEY.

(No Model.) 5 Sheets—Sheet 4.

W. A. THACHER.
DUMPING CAR.

No. 489,242. Patented Jan. 3, 1893.

WITNESSES:
Gustave Dieterich
Ed. D. Miller.

INVENTOR
William A. Thacher,
BY
Chas. B. Gill
ATTORNEY.

(No Model.) 5 Sheets—Sheet 5.
W. A. THACHER.
DUMPING CAR.

No. 489,242. Patented Jan. 3, 1893.

WITNESSES: Gustave Dieterich. Ed. D. Miller.

INVENTOR William A. Thacher, BY Chas. C. Gill ATTORNEY.

UNITED STATES PATENT OFFICE.

WILLIAM A. THACHER, OF NEW YORK, N. Y.

DUMPING-CAR.

SPECIFICATION forming part of Letters Patent No. 489,242, dated January 3, 1893.

Application filed September 12, 1892. Serial No. 445,599. (No model.)

*To all whom it may concern:*

Be it known that I, WILLIAM A. THACHER, a citizen of the United States, and a resident of New York, in the county of New York and State of New York, have invented certain new and useful Improvements in Dumping-Cars, of which the following is a specification.

The invention relates to improvements in dumping cars, and comprises a car body having sections capable of being tilted to dump their load and compressed air mechanism under the control of the engineer of the train for successfully releasing and moving said sections on their pivotal bearings, all as hereinafter more particularly described and pointed out in the claims.

The car illustrated in the drawings belongs to the class of cars used for conveying coal upon elevated tracks at receiving stations and dumping the same between the ties, and while said car possesses features of novelty, as hereinafter explained, the compressed air apparatus forming a part of the invention is not limited to the same, since it is also applicable to cars in which the compartment sections are mounted to dump their load to the sides of the track. The compressed air mechanism embraces a main or dumping cylinder by which the tilting sections of the car may be moved on their pivotal bearings, a latch cylinder co-operating through its piston and rod with the latch which locks the tilting car-section in its horizontal position or releases the same, and a release cylinder containing a sliding release valve for relieving back pressure and permitting a rapid reciprocation of the piston in the dumping cylinder, thus securing a quick action in the car body, as hereinafter more fully described.

Figure 2:
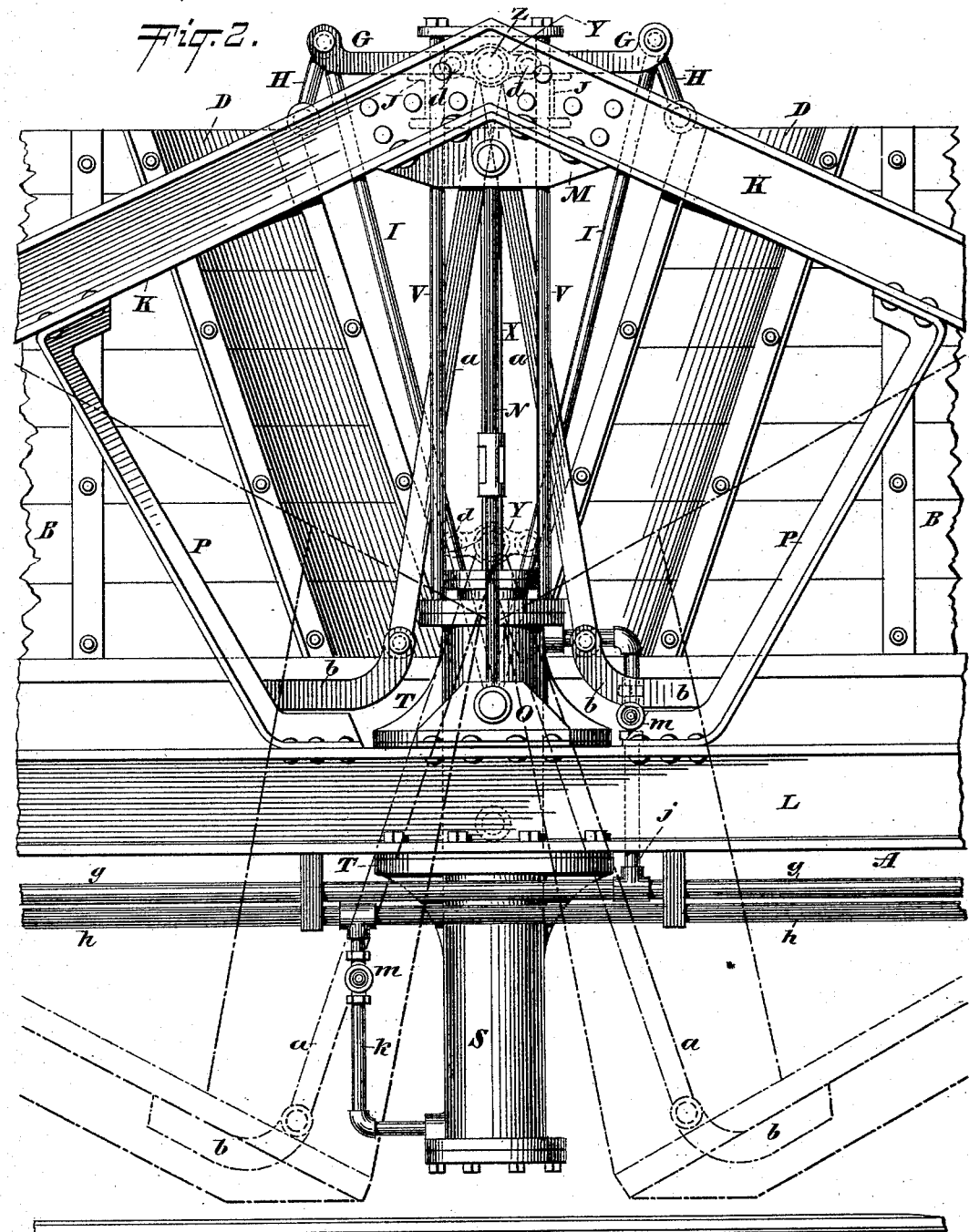
Figure 3:
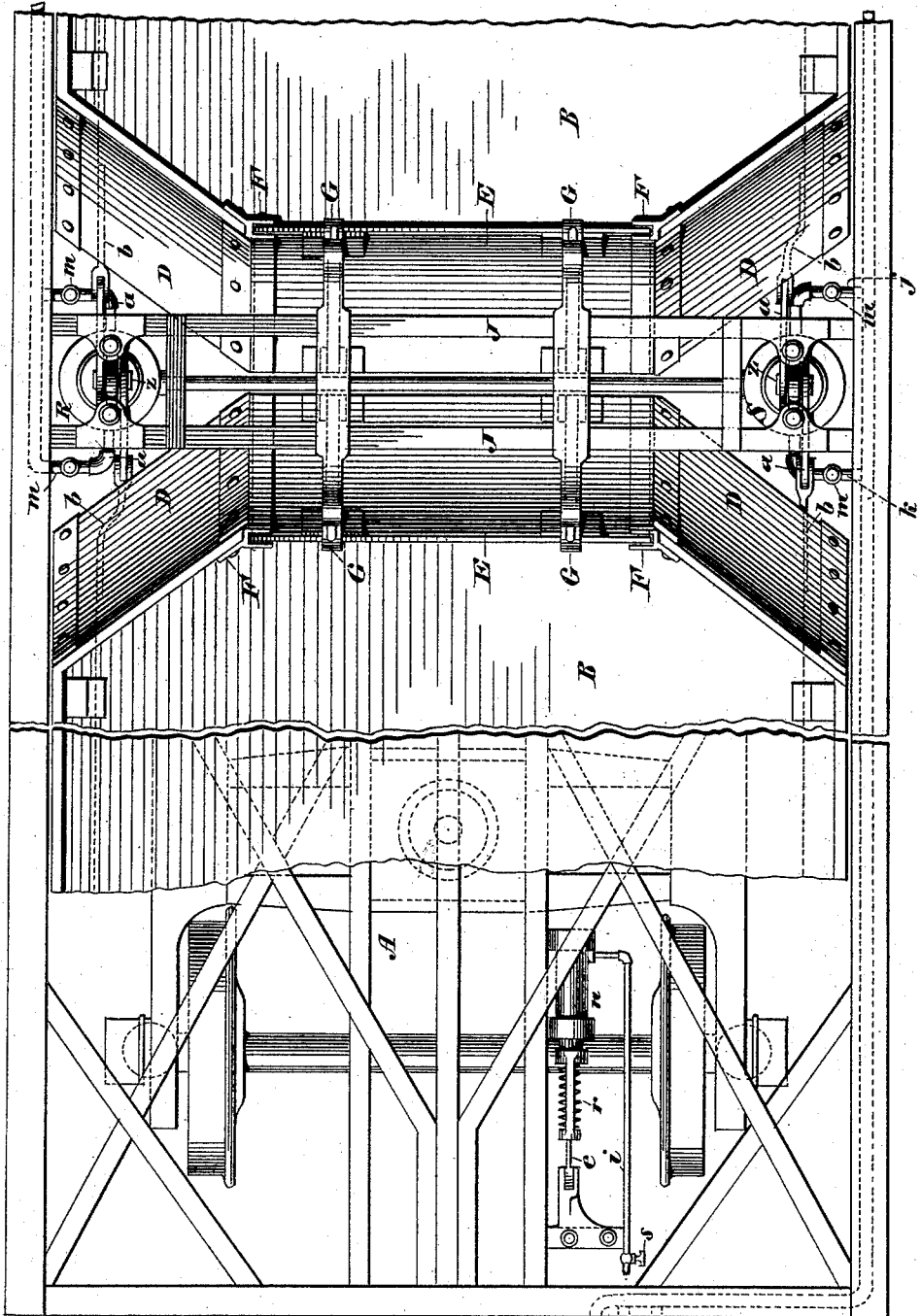
Figure 4:
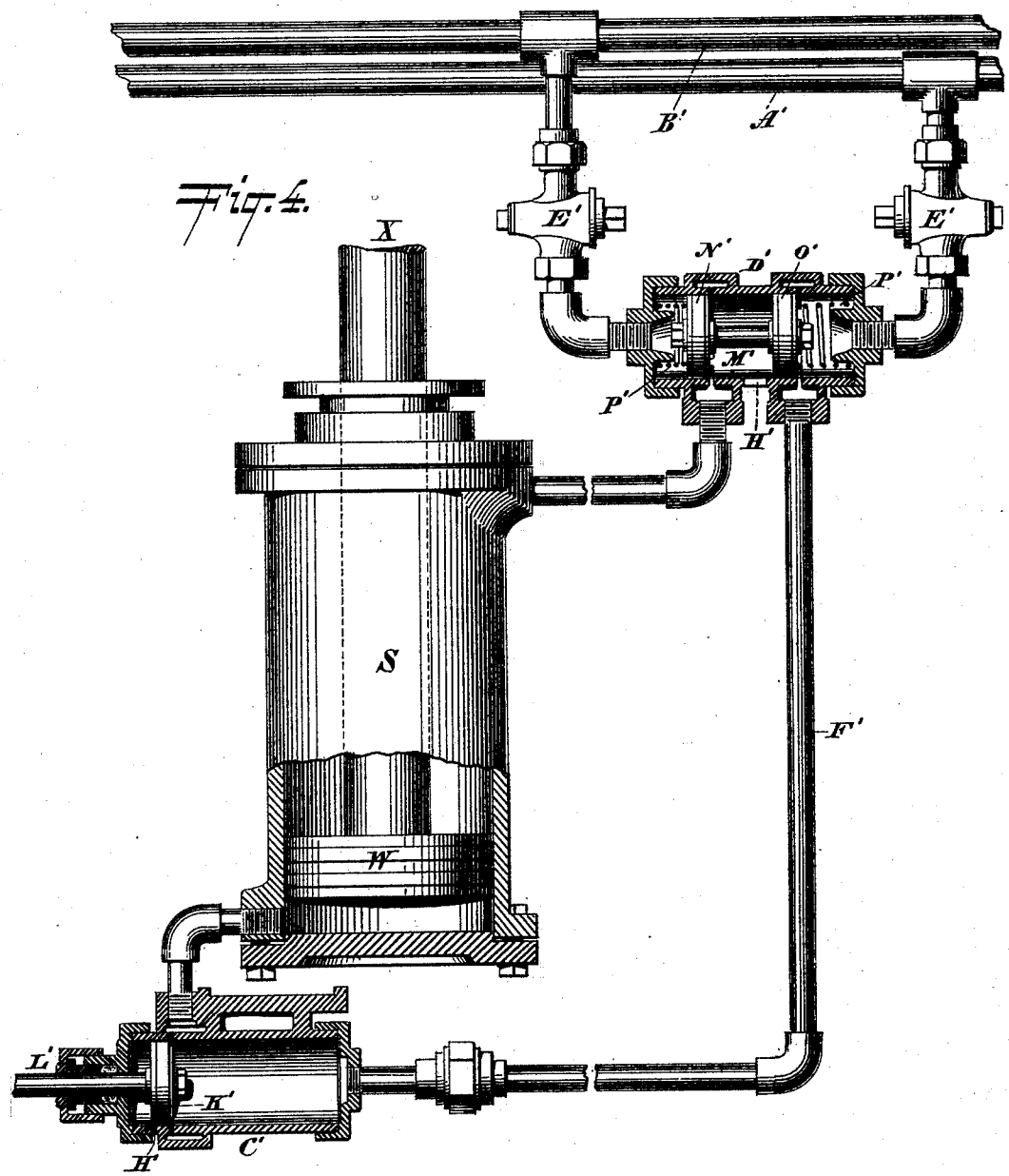
Figure 5:
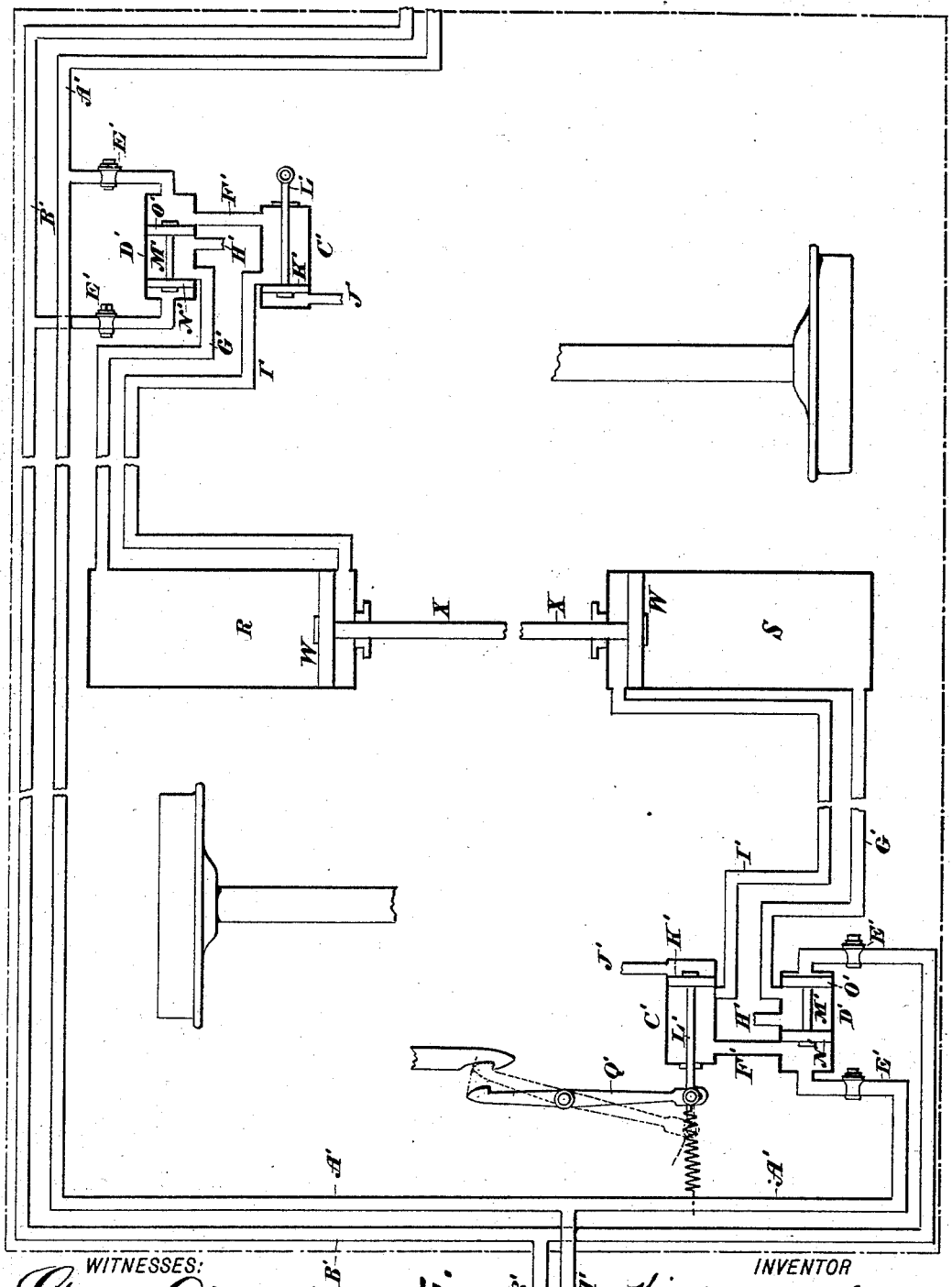

Referring to the accompanying drawings forming a part of this specification: Figure 1 is a side elevation, partly broken away, of a car constructed in accordance with and embodying the invention, the position of the ends of the car body while dumping being indicated by dotted lines; Fig. 2 is a side elevation on an enlarged scale showing the middle portions of the car with the connections between the receiving compartments for dumping the latter and holding the doors while the facing ends of the compartments leave them; Fig. 3 is a top plan view, partly broken away, of the said car embodying the invention; Fig. 4 is a detached plan view on an enlarged scale and partly in section, of one of the dumping cylinders, with connecting latch and release cylinders, the dumping cylinder being turned on its side for clearness of illustration; and Fig. 5 is a diagram view showing the main air pipes and connections with the dumping, latch and release cylinders for the entire car, the dumping cylinders being turned from a vertical to a horizontal position for clearness of illustration.

In the drawings A designates the truck frame, and B, B, the sections or receiving compartments forming the body of the car, and which sections are each mounted on a transverse rod C permitting them to be tilted downward toward each other, as shown by dotted lines, for the purpose of dumping their contents between the ties of the track. When in their upward or horizontal position the sections B, B, will be sustained at their outer ends on the truck frame and in that position held by suitable latches hereinafter described. The facing portions of the sections B, B, are of novel form, each being composed, as shown, of the inwardly and upwardly and outwardly inclined rigid end pieces D, D, and upwardly and outwardly inclined door E, the latter not forming a rigid part of the sections B, B, but being suspended in guides F, F, so that as the sections B, B, are tilted downward they will pass from the doors, thus opening the space between the end pieces D, D, and permitting the load to escape. As will be observed from the dotted lines, the upward and outward inclination of the end pieces D, D, and doors E, E, permit the sections B, B, to tilt downward toward each other close to the track, and, when in their horizontal position, to be in near relation to each other at their lower inner portions, preserving the greatest amount of carrying capacity in the car. The inward inclination of the end pieces D, D, afford a triangular space to receive the dumping cylinders and serve as guides to direct the entire load from the sections B, B, to points within the line of the usual track rails. The inner edges of the end pieces D, D, also afford suitable means for supporting the guides F, F, for the doors E, which are suspended from the arms G, G, by the links H, I, pivotally secured at each end and adapted to sustain and retain the doors E, E, while the sections B, B, draw downward from them and then elevate in position to have their ends closed by said doors. The doors E, E, remain stationary with the exception of yielding through their links H, I, sufficiently to allow the free tilting movement of the sections B, B. The arms G, G, are secured upon the transverse beams J, (see Fig. 3,) supported by the diverging truss beams K, K, (see Figs. 1 and 2) at opposite sides of the car. The lower ends of the truss beams K, K, are riveted to the longitudinal side truck beams L, and produce a durable structure, adding strength to the car and forming substantial supports for the beams J and mechanism connected with the compressed air apparatus. Below the upper portion of the truss beams K, K, is riveted the plate M, and between this plate and the side beam L is the turn-buckle rod N, which increases the strength of the structure and may be shortened if necessary at any time to take up or prevent any downward bowing of the middle portion of the truck frame. The lower end of the rod N is directly secured to a bracket O which is riveted to the beam L. Between the truss beams K, K, and the beam L are rigidly secured the braces P, P, which extend downward and inward, as shown in Fig. 2, on lines best adapted to afford the greatest amount of strength. Between the truss beams K, K, and side beam L are also rigidly secured the plates Q, (see Fig. 1,) which furnish bearings for the transverse rods C on which the sections B, B, are respectively mounted.

At opposite sides of the middle portion of the car and within the triangular spaces formed by the end pieces D, D, are the dumping cylinders R, S, which are supported partly by brackets T secured to the truck frame and partly by the vertical guide rods V extending upward from the head of the cylinders and secured by nuts at their upper ends. Within the dumping cylinders R, S, are pistons W, whose normal position is at the upper end of the cylinders and whose rods X extend vertically upward and carry the cross-heads Y on the pivots Z, to which are secured the upper converging ends of the links a, a, the lower ends of the latter being pivotally secured to the bracket arms b, b, affixed to the car-sections B, B. It will thus appear obvious that upon the depression of the pistons W the piston rods X will pull downward on the links a, a, and (the latch mechanism having been freed) tilt the car-sections B, B, to the position indicated by dotted lines, carrying the said sections from the doors E, E, and permitting the load to discharge. Upon the return or upward movement of the pistons W their rods X will elevate the links a, a, and through them draw the car-sections B, B, upward to their former horizontal position and permit the doors E, E, to close the ends thereof. The dumping cylinders R, S, operate in unison and each is provided with inlets at each end so that the pistons W may be positively moved in either direction under the full control of the engineer. The cross heads Y carry at their ends small rollers d, which travel between the rods V and thus serve to guide the piston rods X at their upper ends and render more effective the operation of tilting the car sections B, B.

The sections B, B, when in their horizontal position will be secured at their outer ends by pivoted latches e, engaging a hook or projection f extending downward from said sections, (see Fig. 1;) and these latches it is proposed to operate by the action of compressed air, so as to free the hooked-projections f preparatory to the dumping of the load.

The parts of the invention hereinbefore described are not limited to the special arrangement of the pipes for conveying the air to the dumping cylinders and to the latch, and hence in the drawings two arrangements of air pipes are shown, one being illustrated in Figs. 1, 2 and 3, and the other in Figs. 4 and 5, and the latter arrangement being the one which I prefer and which forms a part of the invention sought to be protected by this specification.

Referring to Figs. 1, 2 and 3, it will be observed that three main line pipes g, h, i, are employed, the pipes g, h, being respectively connected with the opposite ends of the dumping cylinders R, S, by branch connections j, k, containing valves m, which when closed will cut off the air entirely from the dumping cylinders and permit the car-sections B, B, to remain at rest, while the air passes on to the adjoining cars for the purpose of dumping them. When the air is allowed to enter the upper end of the dumping cylinders R, S, it will depress the pistons therein and cause the rods X, cross-heads Y and links a, a, to move downward to their lower position, shown by dotted lines, thus tilting the sections B, B, from their doors E, E, and dumping the load; and when the air is cut off from the upper end of the dumping cylinders and turned into the lower end thereof, the rods X, cross-heads Y and links a, a, will be moved upward and carry the sections B, B, back to their horizontal position. The engineer may at any time turn the air into both ends of the dumping cylinders at one time and thus hold the sections B, B, in any desired position, or by quickly alternating the pressure on opposite sides of the pistons in the dumping cylinders cause the sections B, B, to rock on their bearings for the purpose of aiding the discharge of the load. The pipe line i leads to latch cylinders n, whose piston rods connect with the lower ends of the pivoted latches e, and pull said latches free of the hook f when the air is admitted to the cylinders n, thus freeing the sections B, B, and permitting them to be tilted by the dumping cylinders R, S. Upon the air being cut off from the latch cylinders n, springs r will retract the latches e to their former position and move the pistons to the inner ends of the latch cylinders n. The latches e are spring latches which are opened by the compressed air to free the car sections and then closed or re-set by the springs r. The pipe i will have a valve s by which the air may be cut off from the car when desired.

The compressed air mechanism above referred to by reference letters, is effective for the purposes stated, but the compressed air mechanism which I more especially desire to secure in this specification is illustrated in Figs. 4 and 5, in which but two main pipe lines A', B', are employed and lead respectively to the upper and lower ends of the dumping cylinders R, S. Interposed in the main lines A', B', by means of suitable branch pipes are the latch cylinder C' and release cylinder D' for each dumping cylinder. The release cylinder D' is connected at one end with the main line pipe A' and at the other end with the main line pipe B', suitable valves E' being provided to entirely cut off the release cylinder when desired. The release cylinder D' is also connected at one end by a branch F' with one end of the latch cylinder C', and by a branch pipe G' the other end of said release cylinder D' is connected with the end of the dumping cylinder S, while between the branches F', G', the release cylinder is provided with an exhaust or discharge pipe or port H'. The latch cylinder C' in addition to being in communication with the release cylinder D' through the pipe F' is also connected with one end of the cylinder S by a pipe I'; and said cylinder C' is also provided with the exhaust or discharge port J' and with the piston and rod K', L'. Within the release cylinder D' is provided the sliding valve M' having the heads N', O', which, as shown in Fig. 4, are cushioned at the ends of the cylinder D' by the coiled springs P'. The valve M' is free to be moved in either direction by the air entering the cylinder D' from the pipes A', B', and in Fig. 5 it is shown in the position it will be given by the air entering the cylinder D' from the pipe A', which position causes the air from said pipe A' to first pass through the branch pipe F' into the latch cylinder C', driving its piston K' and rod L' inward and freeing the latch Q', and thence through the branch pipe I' into one end of the cylinder S, with the result of moving the piston W and tilting the car, while at the same time the air in the other end of the cylinder S is permitted to freely exhaust or be released through the pipe G' and port H'. Thus the one release valve M' will serve to both direct the air to the proper end of the cylinder S and permit the air at the other end thereof to freely exhaust. Upon the air being admitted to the release cylinder D' through the pipe B', the valve M' will be moved in the opposite direction, at which time (the spring R' having drawn the piston K' outward and re-set the latch Q') the air will pass through the branch pipe G' into the lower end of the cylinder S, while at the same time the air at the other end of said cylinder may freely escape through the pipe I' latch cylinder C' and port J', the result being that the car sections will be very comfortably returned to their former horizontal position. The release valve M' acts quickly under the full pressure of the compressed air, and hence the engineer may rapidly alternate the air from the pipe A' to the pipe B' and vice versa, the result being that the full pressure of the air may be utilized to effect a quick movement of the pistons in the dumping cylinders either for dumping the car-sections B, B, or returning them to their horizontal position, or for shaking or rocking said sections on their bearings to more effectually or rapidly discharge their load. It will be observed also that the latch cylinder C' is connected in the main pipe line and hence it will operate to free the spring latch Q' before the car sections B, B, tilt downward.

I have described above the operation of the release and latch cylinders connected with the cylinder S, but as illustrated, the cylinder R will also be provided with the latch and release cylinders and connecting pipes corresponding with those more particularly referred to above, and this duplicate set of devices for the cylinder R having a corresponding and simultaneous operation with those connected with the cylinder S and being designated by like reference letters will be fully understood without a more minute explanation.

In Fig. 4 the latch and release cylinders are shown in section and on an enlarged scale so as to more fully indicate their details of construction, but owing to want of space their position and plan of general arrangement are not illustrated so fully as in Fig. 5. The release cylinder D' is of particular importance, since it insures the quick release of the air from the actuating or dumping cylinders and renders the use of the cars more effectual.

It will be apparent from the foregoing description that the car sections B, B, may be tilted to dump their load and then returned to position by the positive action of the compressed air, and that said sections may be shaken or rocked on their bearings by the compressed air to more effectually discharge their load. The cylinders R, S, have a simultaneous operation, and each of the piston rods X is, through the links a, a, connected with both of the car sections B, B, thus insuring an even and simultaneous action on the said sections.

I do not confine the invention to the precise details of construction shown and described, but claim the right to modify these at will within the scope of the invention as claimed.

What I claim as my invention and desire to secure by Letters Patent, is—

1. In a car, the tilting sections B B mounted on transverse rods, and having the inwardly and upwardly and outwardly inclined facing ends D D combined with the guides F, the independent doors E and the links suspending said doors; substantially as and for the purposes set forth.

2. In a car, the combination of the tilting sections mounted on transverse rods, the longitudinal beams L, the truss beams K K secured to said beams L and the brace beams P intermediate of the beams K, L, substantially as set forth.

3. In a car, the combination of the tilting sections mounted on transverse rods, the longitudinal beams L, the truss beams K K secured to said beams L, the brace beams P intermediate of the beams K L, the plates M secured to the angle of the truss beams, and the rods N intermediate of said plates and the beams L, substantially as set forth.

4. In a car, the tilting sections B, B, combined with the suspended doors E, and compressed air mechanism connected with said sections for tilting the same; substantially as set forth.

5. In a car, the tilting sections B, the doors E, and the links suspending said doors, combined with the dumping cylinders having pistons and rods, and link connections intermediate said rods and said sections for imparting movements from the former to the latter; substantially as set forth.

6. In a car, the tilting sections B, B, combined with the dumping cylinder having the piston and rod, and the links connecting said rod with both of said sections; substantially as set forth.

7. In a car, the tilting sections B, B, having doors at their facing ends, combined with the cylinders R, S, at opposite sides of the car, the piston rods, and the links a, a, connecting said rods with both said sections at opposite sides of the car; substantially as set forth.

8. In a car, the tilting sections B, B, having doors at their facing ends, combined with the cylinders R, S, at opposite sides of the car, the piston rods X therefor, the cross heads Y carried by said rods, the vertical guide rods for said cross heads, and the links intermediate said piston rods and said sections; substantially as set forth.

9. In a car, the tilting sections and the independent suspended doors therefor, combined with latches for locking said sections in their horizontal position, compressed air mechanism for freeing said latches, and compressed air mechanism for tilting said sections; substantially as set forth.

10. In combination with the tilting body of a dumping car, the dumping cylinder having a piston and rod for tilting said body, inlets at the opposite ends of said cylinder, and a release valve for releasing the air from one side of the piston when air is admitted to the other side thereof, substantially as set forth.

11. In combination with the tilting body of a car, the dumping cylinder having a piston and rod for tilting said body, inlets at the opposite ends of said cylinder, and a double acting release valve intermediate said inlets and ports and admitting the air to one side of the piston and releasing it from the other side thereof; substantially as set forth.

12. In combination with the tilting body of a car, the dumping cylinder having a piston and rod for tilting said body, inlets at the opposite ends of said cylinder, the main pipe lines connected with said inlets, the latch cylinder connected in the main pipe line supplying air to tilt the car body, and the latch connected with the piston rod of said latch cylinder; substantially as set forth.

13. In combination with the tilting body of a car, the dumping cylinder having a piston and rod for tilting said body, inlets at the opposite ends of said cylinder, the main pipe lines feeding said inlets, the release cylinder intermediate said inlets and having an exhaust port, and the release valve therein exposed to the force of the air and admitting air to one inlet while exhausting it from the other inlet; substantially as set forth.

14. In combination with the tilting body of a car, the dumping cylinder having a piston and rod for tilting said body, inlets at opposite ends of said cylinder, and the latch and release valve cylinders intermediate said inlets; substantially as and for the purposes set forth.

15. The main cylinder having a piston and rod, and inlets at each end of said cylinder, combined with an automatic release valve intermediate said inlets and admitting air to one inlet while releasing it from the other inlet; substantially as set forth.

16. In combination with the tilting body of a car, the dumping cylinder having a piston and rod for tilting said body, the release valve cylinder, the main pipe lines leading to opposite ends of said cylinder, the latch cylinder, the pipe leading from the release valve cylinder to the latch cylinder, and the pipes leading from the latch and release valve cylinders to the opposite ends of the dumping cylinder; substantially as set forth.

Signed at New York, in the county of New York and State of New York, this 10th day of September, A. D. 1892.

WILLIAM A. THACHER.

Witnesses:
CHAS. C. GILL,
ED. D. MILLER.